Aug. 28, 1962   J. M. DRAUGHON ETAL   3,050,993
HYDRAULIC DYNAMOMETER AND PROCESS OF USING SAME
Filed Aug. 28, 1959
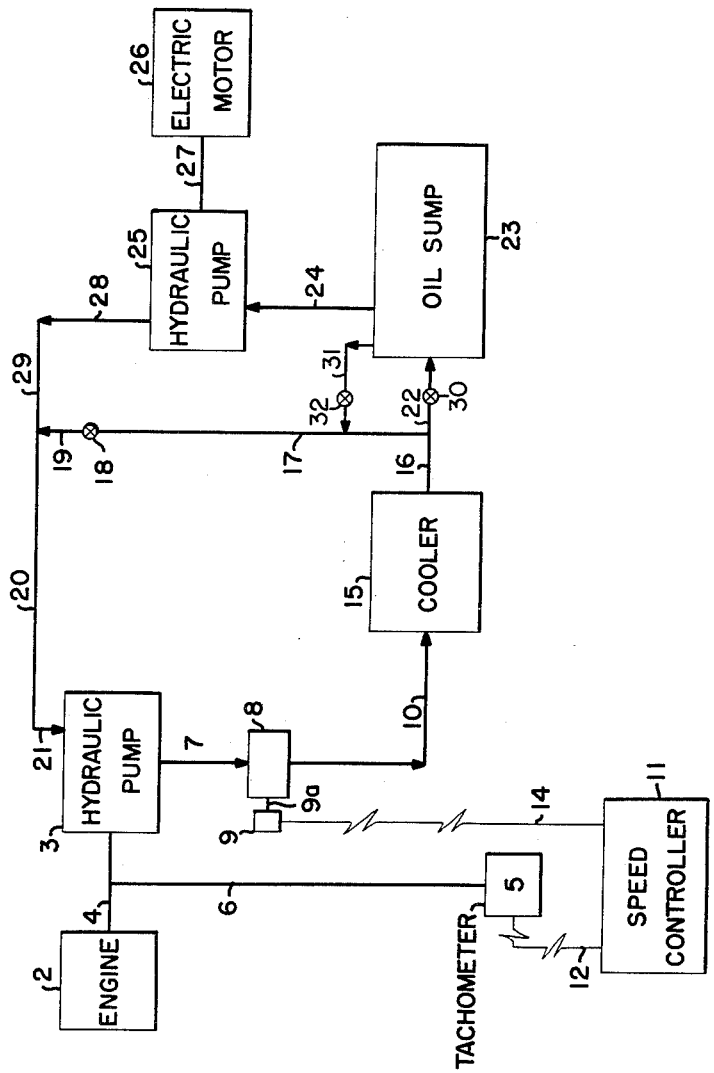
John M. Draughon
Robert L. VanVoorhies   Inventors
By Ernest V. Haines   Patent Attorney United States Patent Office 3,050,993
Patented Aug. 28, 1962

3,050,993
HYDRAULIC DYNAMOMETER AND PROCESS OF USING SAME
John M. Draughon, Franklin Park, and Robert L. Van Voorhies, Mountainside, N.J., assignors to Esso Research and Engineering Company, a corporation of Delaware
Filed Aug. 28, 1959, Ser. No. 836,777
1 Claim. (Cl. 73—116)

The present invention relates to a novel test dynamometer for internal combustion engines. More particularly the invention relates to a test dynamometer, hydraulic in nature, and by means of which it is possible to so control a test engine as to make it possible to operate the engine at a constant number of revolutions per minute or, if desired, to operate the test engine at any preselected speed and power output.

Test engines conventionally are employed for many purposes, among which may be mentioned the testing of new engines as one of the inspection steps in determining whether or not the engine has been manufactured to specification and is satisfactory in operation. Other uses of test engines involve the critical inspection and determination of the properties, of lubricating oils, under varying conditions, and of fuels under varying types of operating conditions, for example, under extremely high or low temperatures. Data secured as to the condition of the engine or the successful use of fuels under varying conditions afford valuable information for the engineer attempting to improve fuels, lubricating oils, engine design and performance.

In the past, it has been customary to employ eddy current type electrical dynamometers for these purposes. These employ, of course, a magnetic field which produces a load on the output shaft of the engine on test. Such dynamometers are costly to install and are fairly expensive to maintain. They require elaborate instrumentation and an initially high capital investment.

In contrast to the use of such dynamometers, the construction of the instant novel hydraulic dynamometer and its use affords a more economical operation, considerable lower initial capital investment cost and its maintenance cost is proportionally reduced. Additionally, the expense of operation of the unit and the instrumentation required are improved over that customarily found in installations involving electrical dynamometers. The torque output from a test engine when employing the novel hydraulic dynamometer herein described can be directly read on pressure gauges and no further torque instrumentation is required to obtain this information. The capital outlay required for installing a dynamometer of the type hereinafter fully described amounts to about one-third the total cost of installing the eddy current type dynamometer customarily and conventionally employed. The electrical control gear customarily employed in the electrical dynamometer is wholly absent and the pumps which are employed in the hydraulic dynamometer such as the type used and herein described have a lifetime, with a minimum of maintenance, in excess of 20,000 hours. Although it may be used on various test engines, and even for testing electric motors, normally operating at high, medium or low speeds, the herein described novel hydraulic dynamometer is particularly adapted for use in the operation of internal combustion test engines customarily turning at speeds of about 1400 r.p.m. or less. Such dynamometers are useful, particularly in the operation of low speed test engines such as diesels and single cylinder spark ignition engines.

The accompanying drawing illustrates diagrammatically the construction and design of the novel hydraulic dynamometer.

Referring now to the drawing, test engine 2, through its crank shaft is directly connected by means of shaft 4 with the shaft of constant displacement hydraulic pump 3. When the engine 2 is on test, its power output is transferred to the constant displacement hydraulic pump 3 having its fluid outlet conduit 7 passing through variable control valve 8, through hydraulic conduit line 10, and into heat exchanger or cooler 15. The cooled hydraulic fluid, by means of conduits 16, 17, check valve 18, conduits 19, 20 and 21, is returned to the inlet side of constant displacement hydraulic pump 3. Hydraulic check valve 18 is spring loaded so that fluid under startup conditions, as more fully hereinafter described is prevented from flowing in the opposite direction through conduits 17 and 19. Variable flow control valve 8 has its orifice size adjusted "on test" for engine 2 depending on the speed selected by speed controller 11. This in turn controls the speed, i.e., the r.p.m. of test engine 2, because it places a load by means of the back pressure on the pump 3. Variable flow control valve 8 may be operated manually and may be adjusted so as to give a constant r.p.m. to engine 2 by reference to the readings on tachometer 5 which is connected to the drive shaft on crank shaft extension 4 by means of connection 6. Alternatively, the tachometer 5 may be provided with an electrical outlet which is connected by means of electrical connection 12 to speed controller 11 whose output is electrically conducted by means of electrical connection 14 to servo valve 9 which in turn is connected by means of connection 9a to the variable flow control valve 8 so that the orifice in that valve is adjusted in aperture to give the desired r.p.m. output from test engine 2 depending on the r.p.m. registered by the tachometer 5, as compared with the speed selected by speed controller 11.

The startup of the hydraulic system and test engine 2 requires a slightly different operation of the hydraulic system as can be readily understood from the following. In starting up test engine 2, control valve 8 is open to its fullest extent so as to avoid any back pressure build up in conduit 7. Valve 30 is open. Oil from sump or reservoir 23 is pumped by means of conduit 24 and variable displacement hydraulic pump 25 through the system. The prime mover or external power source for variable displacement pump 25 is shown conventionally to be an electric motor 26 connected through its drive shaft 27 to hydraulic pump 25. The hydraulic fluid output of hydraulic pump 25 is conducted by means of conduits 28, 29, 20 and 21 into the constant displacement hydraulic pump 3. Energy from the flow of this oil serves to drive constant displacement pump 3 which, as previously stated, is directly connected by shaft 4 to test engine 2. Engine 2 is thus cranked and is started upon opening of a fuel valve (not shown). During the startup period and while engine 2 is being cranked, the fluid output from pump 3 passes through conduit 7, open control valve 8, conduit 10, cooler 15, conduit lines 16 and 22, open valve 30, and back to the oil sump or reservoir 23 and the cycle is repeated.

Once test engine 2 has been started and power to drive hydraulic pump 3 thus supplied from engine 2, the displacement output of hydraulic pump 25 is no longer required and is removed from the circuit. At the same time, valve 30 is closed and control valve 8 is gradually either manually or automatically closed at least to the speed setting desired for buildup of the desired back pressure in conduit 7 at which time the hydraulic fluid no longer is conducted by means of conduit 22 into sump 23, but by reason of its increased pressure through conduits 17 and 19 which are controlled by check valve 18, it flows, as previously described, through conduits 16, 17, 19, 20 and 21. Valve 30 is a pressure relief valve set, when in the closed position, to open only when the line pressure in line 16 at the connection with line 22 exceeds that normally existing in the "running" hydraulic circuit beyond valve 8, i.e. in lines 10, 16, 19, 20 and 21. Valve 30 in closed position normally simply prevents oil from returning to sump 23.

Tachometer 5 is electrically connected with speed controller 11. Controller 11 contains a conventional bridge circuit arranged so that imbalance in the bridge causes a flow of current to the servo valve 9 in the direction required to rotate the valve in the direction required to correct the imbalance in the bridge. The electrical signal coming from controller 11 is conducted through electrical connection 14 to servo valve 9 which is activated to give the desired orifice setting in control valve 8. The signal translated by servo valve 9 into the orifice setting for the back pressure valve 8 is so accurate that the back pressure in conduit 7 effectively and accurately controls the revolutions per minute under which test engine 2 is operated. Within limits, the fuel injector, in the case of diesel test engines, or the carburetor, in the case of gasoline driven engines, can be varied over a considerable range without materially altering the r.p.m. of the engine. The torque output, it has been found, can be read by inserting a pressure gauge in conduit 7 and is directly proportional to the pressure on the outlet side of the constant displacement hydraulic pump 3. A four cylinder Gray marine engine has been successfully operated over a considerable period of time while employing the aforementioned hydraulic dynamometer system. These tests indicated an extremely accurate control of the revolutions per minute under which the engine operates.

In cases where a test engine has been in test usually over a considerable and continuous period of operation, some hydraulic oil may tend to leak back to the sump through pressure relief valve 30, for the most part due to momentary fluctuations in oil pressure. It is then necessary to replenish the oil in the circuit since the presence of air in the circuit results in an uneven and erratic load being placed on engine 2. Accordingly, make-up oil is supplied to the system by opening valve 32 in line 31 and pumping oil by means not shown, from sump 23 into line 17 by means of line 31. Normally valve 32 remains closed.

The hydraulic system illustrated in the drawing embodies a single test engine installation employing a single oil sump and a single start-up unit. In practical operation, however, the single oil sump and start-up unit is employed in conjunction with several test engine installations. For such multi-unit operation, a three-way selector valve is installed in line 28 or line 29, and line 22 becomes a manifold with several return lines joined to it, so that once engine 2 has been started and is on test, the selector valve is turned to divert the output of pump 25 to a second unit, to start that unit in the same manner as has been described with reference to engine 2. Such multiple test engine installations while employing a single start-up installation, as previously described, provides an economical and efficient overall dynamometer test set-up.

As previously described, hydraulic pump 3 is directly connected to test engine 2 by means of drive shaft 4. Other forms of coupling for power transference between engine 2 and pump 3 can be employed equally well, for example, a reduction gear box or a set of pulleys connected by belts, etc. The same types of power couplings can also be used, through to less advantage, in the connection 27 between prime mover 26 and variable displacement pump 25.

Having now thus fully described and illustrated the character of the invention, what is desired to be secured by the Letters Patent is:

A test dynamometer for operation of an internal combustion engine having a drive shaft, said dynamometer comprising a constant displacement hydraulic pump adapted to be coupled to the drive shaft of said internal combustion engine, and characterized by inlet and outlet sides, a heat exchanger characterized by inlet and outlet sides, a conduit for hydraulic fluid connecting the outlet side of said heat exchanger with the inlet side of said constant displacement pump, a check valve in said conduit disposed to permit flow of fluid through said conduit only from said heat exchanger to said constant displacement hydraulic pump, a flow control valve having electrically actuated opening and closing means, a hydraulic fluid sump, a variable displacement hydraulic pump driven by an external power source, and characterized by inlet and outlet sides, a plurality of conduits for hydraulic fluid to permit flow of said fluid sequentially from the outlet side of said constant displacement pump through said flow control valve to the inlet side of said heat exchanger, from the outlet side of said heat exchanger to said sump, from said sump to the inlet side of said variable displacement hydraulic pump, and from the outlet side of said variable displacement hydraulic pump to the inlet side of said constant displacement hydraulic pump, a pressure relief valve in the one of said plurality of conduits which permits flow from the outlet of said heat exchanger to said sump, said relief valve being disposed to open upon the hydraulic fluid pressure in said heat exchanger being an determined amount greater than that in said sump, a tachometer adapted to be coupled to the drive shaft of said internal combustion engine, a speed controller, first transmission means connecting said tachometer with said speed controller whereby electrical signals generated at said tachometer may be imposed upon said controller, and second transmission means connecting said speed controller with said opening and closing means of said flow control valve whereby electrical signals generated at said speed controller may be imposed upon said opening and closing means.

References Cited in the file of this patent

UNITED STATES PATENTS

| | | |
|---|---|---|
| 1,743,409 | Tracy | Jan. 14, 1930 |
| 2,347,037 | Edwards | Apr. 18, 1944 |
| 2,716,339 | Cline | Aug. 30, 1955 |
| 2,906,088 | Clark | Sept. 29, 1959 |

FOREIGN PATENTS

| | | |
|---|---|---|
| 390,904 | Great Britain | Apr. 20, 1933 |
| 552,586 | Great Britain | Apr. 15, 1943 |